UNITED STATES PATENT OFFICE.

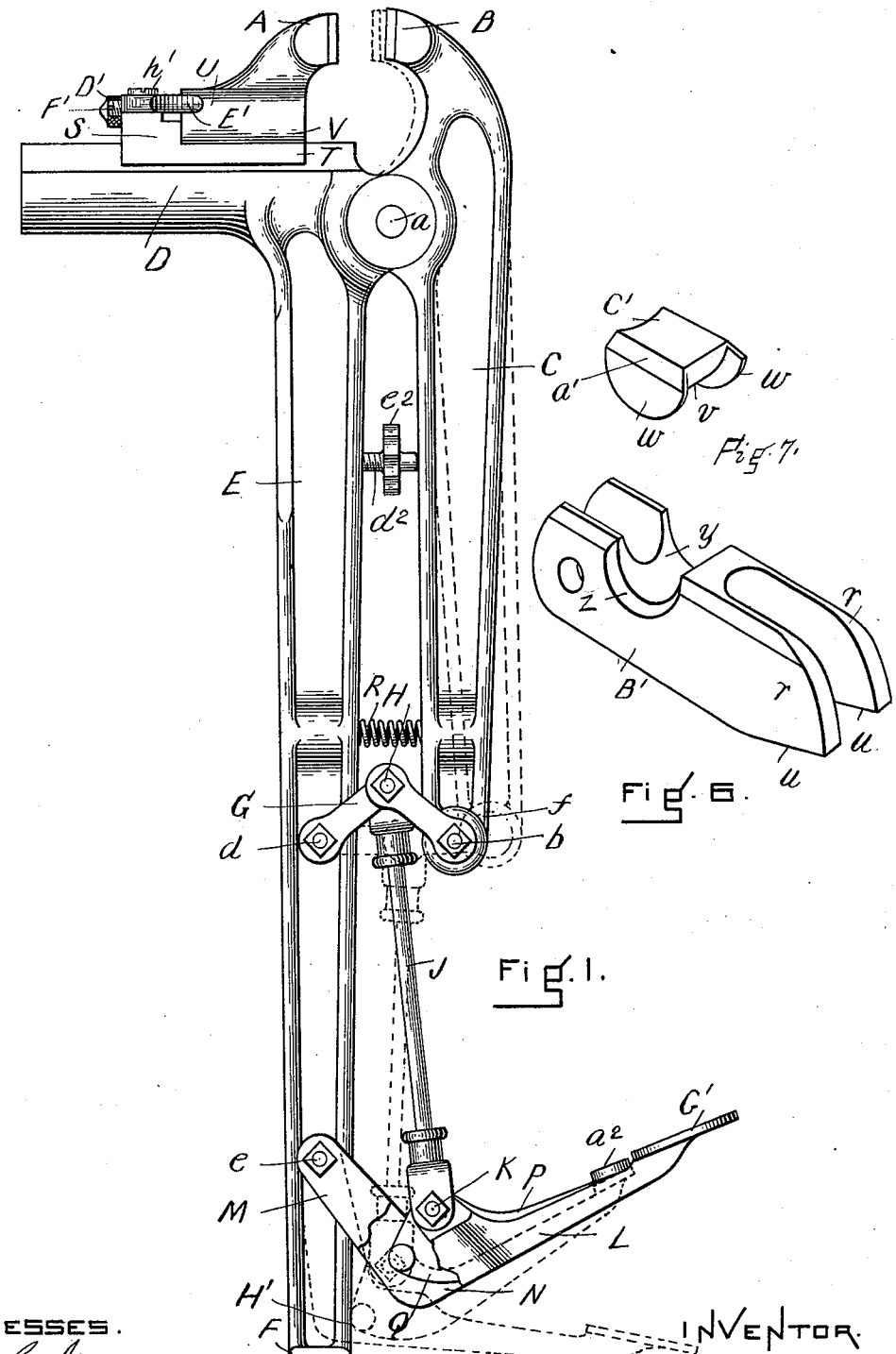

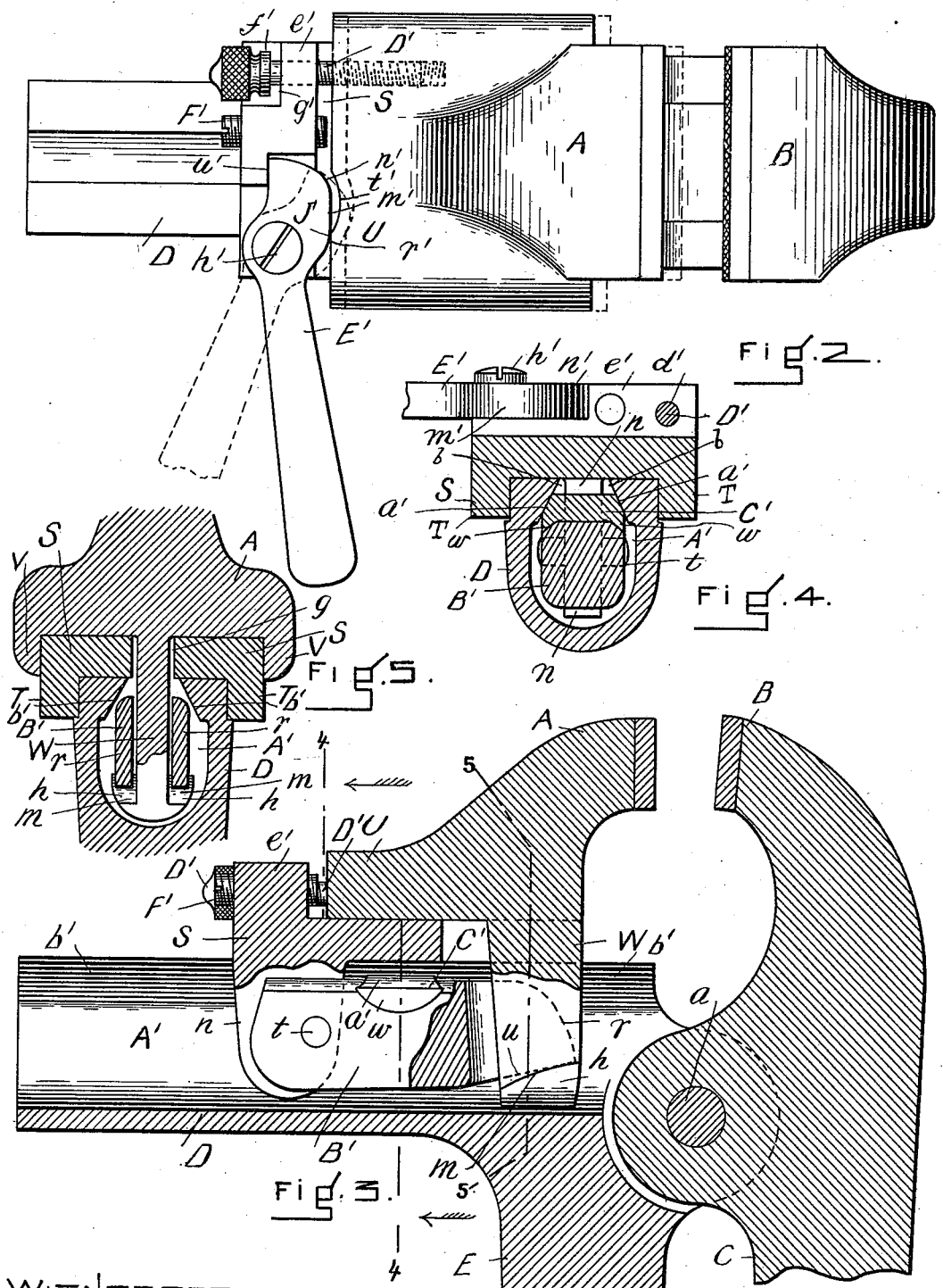

WILLIAM THOMPSON, OF BROCKTON, MASSACHUSETTS.

VISE.

SPECIFICATION forming part of Letters Patent No. 557,453, dated March 31, 1896.

Application filed September 19, 1895. Serial No. 563,004. (No model.)

*To all whom it may concern:*

Be it known that I, WILLIAM THOMPSON, of Brockton, in the county of Plymouth and State of Massachusetts, have invented certain new and useful Improvements in Vises, of which the following is a full, clear, and exact description.

This invention consists, in a clamp or vise, of two jaws suitably adjusted and connected together for operation, and so constructed and arranged that one of the jaws can be easily and quickly moved into position in relation to the other jaw when an article is placed between them so as to be set close to the article for the jaws to be then pressed closely and tightly upon the article to hold it firmly between them, all substantially as hereinafter fully described; and the invention also consists, in a clamp or vise, of two jaws suitably adjusted and connected together for operation, and so constructed and arranged that one of the jaws can be easily and quickly moved into position in relation to the other jaw when an article is placed between them, in combination with other parts that will quickly close the latter jaw upon the article to hold it firmly between the two jaws, and as easily opened, leaving the article free to be removed therefrom, so that in the use of the vise a large number of articles of the same size, as well as articles of varying sizes, can easily, conveniently and quickly be placed in between the jaws and firmly held for operation thereon, and as easily and quickly released therefrom, one after another, with but a slight movement of the jaws and the operating parts, and also without disturbing or altering the general set of the jaws to their work, all substantially as hereinafter fully described, reference being had to the accompanying sheets of drawings, in which is illustrated a vise constructed in accordance with this invention.

Figure 1 is a side view in elevation; Fig. 2, a plan view; Fig. 3, a central vertical section from front to rear; Fig. 4, a detail cross-section on line 4 4, Fig. 3; Fig. 5, a detail cross-section on line 5 5, Fig. 3. Figs. 6 and 7 represent in perspective, respectively, two of the parts of the vise, one above and separated from the other, Figs. 2, 3, 4, 5, 6, and 7 being enlarged.

In the drawings, A and B represent two jaws, one, B, of which is formed by the continuation of an upright bar C, and the other, A, adapted to slide back and forth on a rightangular horizontal portion or head D of another upright bar E, which latter bar is secured to the floor at F, or to any suitable support, to hold it and the whole in an upright position convenient for use. The bar C of the jaw B is pivoted at $a$ to the upright E for it to swing thereon for its jaw B to move to and from the other jaw A.

At the lower end of the upright bar C is pivoted at $b$ one end of a toggle-lever G, the other end of the toggle-lever being pivoted at $d$ to the other upright bar E. This togglelever is double—that is, one on each side of the two bars E C—but acting as one, and their central joints are connected together by a rod H making a pivot for the same. Pivoted to this cross-rod H is a bar or rod J, which extends downward and at its lower end is pivotally connected to a cross-rod or pivot K of an annular-shaped lever or treadle L pivoted at $e$ by its forked arms M to each side of the the bar E. Freely disposed between the arms M and in a longitudinal vertical opening N through the treadle-lever L and pivoted to the cross-rod or pivot K is another lever P having a backward-extending arm or portion Q, as shown in Fig. 1.

R is a spiral spring extending freely into and held in a socket in each bar E C and connected to each bar, so that its tension will pull the lower end $f$ of the bar C toward the other bar E, and in such movement cause the jaw B by the swinging of the bar on its pivot $a$ to open or move back from the other jaw A.

The jaw A is arranged to slide back and forth on a block S arranged to move back and forth on the horizontal arm D of the bar E, which block has a lip or flange T on each side projecting down over the sides of the arm, as shown in Figs. 4 and 5, and the jaw has a backward extension U, which has a lip or flange V on each side projecting down over the sides of the block S, as shown in Fig. 5 in section, to hold the jaw laterally in position thereon, and yet allow it to freely move longitudinally back and forth on the block, as desired.

At the front of the jaw A an arm W of the jaw projects downward through a longitudinal slot $g$ in the front of the block S into a longitudinal groove or chamber A' in the upper side of the horizontal arm or head D, the arm W having opposite horizontal lateral extensions $h$ on its end, the upper faces or surfaces $m$ of which incline downward from the front, as shown in Figs. 3 and 5.

B' is a lever pivoted at $t$ over a lug $n$ of the block S and disposed in the arm-chamber A' and extending forward therein for its forked end $r$ to straddle the arm W above its lateral extension $h$ and rest by such ends upon the upper inclined faces $m$ of such extensions, the under faces or edges $u$ of its forked end being also beveled or cut away somewhat, as shown in Fig. 3.

C' is a block having its under side $v$ curved longitudinally, and on each side is a flange $w$ extending below and in line with the curve and beveled on its inner side or surface and adapted by such curve and flanges to lie freely in a corresponding longitudinally-curved open socket $y$ in the upper side of the lever B', and the flanges lying over correspondingly-beveled corners or sides $z$ of the lever, the flanges preventing sidewise movement of the block in its socket. The upper edges or corners of this block are cut away, leaving faces $a'$ at angles to the sides of the block and arranged to lie against the under beveled inner surfaces $b'$ of the two sides of the horizontal arm D, which sides are closer together than the chamber portion of the arm, as shown in Figs. 4 and 5. The curved socket $y$ in the lever B' allows free movement of the block when in use for it to adjust itself to its work. This lever B' and block C' are shown in perspective in Figs. 6 and 7, respectively.

Through a hole $d'$ in the thicker or raised portion $e'$ of the block S a screw D' freely passes, having a flanged head $f'$, which is arranged at certain times to abut against the end $g'$ of the portion $e'$, this screw screwing into the back of the extension U of the jaw A, as shown in Fig. 2, by which the jaw A is secured to the block S and by the turning in or out of which screw the screw-head $f'$, bearing against the back side of the raised portion $e'$, the jaw A is adjusted, as desired, to its position on the block. On top of the block is pivoted a lever E' at $h'$, which has a straight edge $m'$ and a curved or rounded continuation or extension $n'$ of the edge, and in the operation of the lever its straight edge bears first against the end $r'$ of the jaw extension U and then by its rounded portion against the edge and grooved or hollowed-out bearing-surface $t'$ in such end, as shown more particularly in plan in Fig. 2. The operating-arm of the lever E' is prevented from movement backward too far by its abutment against the thicker portion at $u'$.

F' is a screw screwing horizontally through the raised portion $e'$ and to project therefrom toward the jaw extension U, as shown in Fig. 2, as desired, to stop and regulate the backward movement of the jaw on its rest-block S.

In the operation of the vise, the parts being in the positions shown in the figures, if desirous of holding in the vise any article that is much thinner than the space between the two jaws shown in Fig. 1 place the article between the two jaws against the jaw B and then move toward it by hand the jaw A, press the end G' of the treadle L firmly down, which straightens out the toggle G, which is then held in such position by its central joint H passing below its dead-center, which swings the lower end $f$ of the jaw-bar C outward and presses its jaw B firmly against the article between it and the jaw A, holding it tight between them. As the jaw B is moved forward the jaw A only moves back slightly, when it becomes fixed, for in such movement the upper beveled surfaces $m$ of the arm W move under the forked end $r$ of the lever B' and, raising such end, crowds the lever-block C' against the under beveled sides $b'$ of the horizontal arm D of the jaw-bar E and wedges it therein so tightly that the jaw A then becomes rigid, fixed, and immovable on its supporting-block S and on the arm D and thus enables the two jaws to be pressed together to hold the article firmly between them. In the downward movement of the treadle-lever L the arm or extension Q of the lever P is moved down and backward to bear against the jaw-bar E at H', as shown in Fig. 1 in dotted lines, the front end $a^2$ of the lever remaining substantially as in its original position, as shown in said figure in dotted lines. When desirous of removing the article, the lever P is pressed down, and as its arm Q bears against the side of the jaw-bar E it acts as a fulcrum in the downward movement of the outer end of the lever to raise the treadle and toggle-joint sufficiently for its central joint H to be above its dead-center, which allows the spiral spring R to then act and pull the lower end of the jaw-bar C toward the other bar E, swinging the bar C on its pivot, the toggle-lever rising at the same time and the jaw B opening from the other jaw A sufficiently to release the article, so it can be easily taken from the vise.

Another article can be put in of the same size and the vise operated as before and held therein and released therefrom, and so on, without altering the general adjustment of the jaws.

Pressing down the lever P raises the treadle-lever L and thus the central joint H of the toggle-lever from its position of dead-center or lock, for in moving down the end $a^2$ of the lever P its fulcrum end Q, bearing against the side of the bar E, moves upward thereon, and in such movement the pivot K of the lever is moved outward, and thus the lever L is moved or swung outward on its pivot $e$ or laterally from the bar E, and consequently, from the position of the pivot K being at the right of a vertical line with the pivot e and such pivot K traveling in a circular line of which the pivot e is its center, it must necessarily and does move upward, consequently raising the central joint of the toggle-lever sufficiently above its dead-center or position of lock to allow the spring R to act upon the jaw-bar C, as described, to loosen the grip of the jaws on the article placed between them for it to be removed therefrom.

The jaws after once being generally set for their work are always in position to properly receive the same-sized article without having to alter any adjustment of the parts, and by the toggle-lever and operating-lever the jaws can be forced to firmly hold the work between them, as described.

To alter the vise—to receive a larger article, for instance—press the lever E' back, and its end $m'$, then pressing against the end $r'$ of the jaw extension U, moves it forward, and the lateral bearing-surfaces $h$ of the jaw-arm W forward from their bite and hold upon the end $r$ of the lever B', allowing it to fall sufficiently to release the pressure of its block C' upon the arm D, so that the block S, carrying the jaw A, can be easily moved back by hand. Then place the article to be held between the jaws and operate the jaw and treadle-lever as before, when the article will be held firmly in the vise. To release the article, operate the lever P as before, when it is free to be removed.

To get more or less bite or hold upon the article in the jaws, turn in or out the screw $d^2$, which will allow the arm C of the jaw B to come nearer to or be farther from the jaw-bar E, and thus raise or lower the central joint H of the toggle-lever, so that in the movement of the treadle-lever the arm of the jaw will be moved outward correspondingly. The screw $d^2$ screws into the bar E, having a handle $e^2$ for operating it, the bar C abutting against it to hold it from further backward movement. Thus with a slight and easy movement of the jaw along its support the vise can be quickly and conveniently adjusted to receive the work or article to be placed therein.

The lever to push the jaw forward and thus relieve it of its lock with its support has its operating edge made curved or rounded longitudinally, as shown, and the groove in the jaw-head correspondingly curved, or substantially so, to allow the first contact of the lever on the jaw-head as it is moved to release the jaw to be at its shortest fulcrum, as at J', to get the most power at the start, where the most power is required to unlock the jaw, which is very important in operating the vise quickly, and immediately the jaw starts the lever follows up at once, and then, operating on its long fulcrum, moves the jaw the required distance very quickly, saving time in operation. The movement of the jaw, however, is short and only sufficient for it to free its shouldered arm of pressure on the chamber-lever, leaving the jaw and its block-support free to be moved back by hand upon its supporting-arm, as desired, to again close it upon the article to be held in the vise, when the chamber-lever and its block are in position to again lock the jaw from backward movement in the use of the vise.

The backward movement of the jaw on its block is regulated by the screw F', which can be turned in or out, as desired; but in practical operation the movement is small.

Having thus described my invention, what I claim is—

1. In a vise, in combination, two jaws, one jaw suitably arranged to be moved back and forth upon a support, a block on said support arranged to move back and forth thereon, the other jaw arranged to move back and forth on said block, a shouldered arm to this latter jaw, a lever pivoted to the block and adapted to engage with the shouldered arm and the support, to lock and hold the jaw in position, and means for unlocking said jaw.

2. In a vise, in combination, two jaws, one jaw pivoted to an upright bar, a horizontal arm or head projecting backward from said bar, a longitudinal groove or chamber in its upper side, a block arranged to slide back and forth on said head, a lever in said groove pivoted to said block, the other jaw arranged to be moved back and forth on said block, a downward extension of said latter jaw into said groove or chamber arranged to engage with said lever, and a block in said lever arranged to bear against the under sides or shoulders of the sides of the groove or chamber.

3. In a vise, in combination, two jaws, one jaw movably secured to a support, a horizontal arm or head projecting backward from said support, a longitudinal groove or chamber in its upper side, a block arranged to slide back and forth on said head, a lever in said groove pivoted to said block, the other jaw arranged to be moved back and forth on said block, a downward extension of said jaw into the groove or chamber, arranged to engage with said lever and a block in said lever arranged to bear against the under sides or shoulders of the sides of the groove or chamber.

4. In a vise, in combination, two jaws, one pivoted to an upright bar, a horizontal arm or head projecting backward from said upright, a longitudinal groove or chamber in its upper side, a block arranged to slide back and forth on said head, a lever pivoted thereto in said groove, having a forked end, the other jaw arranged to be moved back and forth on said block, a downward extension of said jaw having lateral extensions on its lower end arranged to bear against the under side of the forked end of said lever, and a block in said lever arranged to bear against the under sides or shoulders of the sides of the groove or chamber.

5. In a vise, in combination, two jaws, one pivoted to a support, a horizontal arm or head projecting backward from said support, a longitudinal groove or chamber in its upper side having under beveled sides, a block arranged to slide back and forth on said horizontal arm, a lever pivoted thereto in said groove having a forked end, the other jaw arranged to be moved back and forth on said block, a downward T-shaped projection to said latter jaw, arranged to engage with the forked end of said lever, a curved recess in the upper side of said lever, a block having its under side rounded to fit said curve in the lever, and its upper edges beveled to fit the under beveled sides of the two sides of the groove or chamber.

6. In a vise, in combination, two jaws, one pivoted to a support, a horizontal arm or head projecting backward from said support, a longitudinal groove or chamber in its upper side having under beveled sides, a block arranged to slide back and forth on said horizontal arm, a lever in said groove or chamber pivoted to said block, the other jaw arranged to be moved back and forth on said block, a downward extension of said latter jaw into said groove or chamber arranged to engage with said lever, a curved recess in the upper side of said lever, a block having its under side rounded to fit said recess in the lever, and its upper edges beveled to fit the under beveled sides of the two sides of the groove or chamber.

7. In a vise, in combination, two jaws, one pivoted to an upright bar, a horizontal arm projecting backward from said upright bar, a longitudinal groove or chamber in its under side having under beveled sides, a block arranged to slide back and forth on said horizontal arm, a lever pivoted thereto in said groove having a forked end, the other jaw arranged to be moved back and forth on said block, a downward T-shaped projection to said latter jaw, having the upper surfaces of its T portion beveled or inclined, and arranged to engage with said lever, a curved recess in the upper side of said lever, a block having its under side rounded to fit said curve in the lever, and its upper edges beveled to fit the under beveled sides of the groove or chamber.

8. In a vise, in combination, a jaw arranged to move back and forth on a suitable support, and to be secured thereto a hollowed or inwardly-curved bearing-surface in the end or edge of said jaw, a lever pivoted to said block having a straight edge and a curved or rounded continuation or extension thereof, and arranged in its operation to bear first by its straight edge upon the end or edge of the jaw, and then by its rounded edge against said edge and hollowed portion.

In testimony whereof I have hereunto set my hand in the presence of two subscribing witnesses.

WILLIAM THOMPSON.

Witnesses:
  EDWIN W. BROWN,
  LEONA C. ARNO.